United States Patent
Nagao (10) Patent No.: US 10,267,919 B2
(45) Date of Patent: Apr. 23, 2019

(54) POSITIONING SYSTEM, ON-BOARD DEVICE, AND POSITIONING METHOD

(71) Applicant: HONDA MOTOR CO., LTD., Tokyo (JP)

(72) Inventor: Akira Nagao, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 15/090,183

(22) Filed: Apr. 4, 2016

(65) Prior Publication Data

US 2016/0291161 A1    Oct. 6, 2016

(30) Foreign Application Priority Data

Apr. 3, 2015    (JP) ................................ 2015-077049

(51) Int. Cl.
| | |
|---|---|
| *G01S 19/07* | (2010.01) |
| *G01S 19/40* | (2010.01) |
| *G01S 19/09* | (2010.01) |
| *G01S 19/42* | (2010.01) |

(52) U.S. Cl.
CPC .............. *G01S 19/07* (2013.01); *G01S 19/40* (2013.01); *G01S 19/09* (2013.01); *G01S 19/42* (2013.01)

(58) Field of Classification Search
CPC .......... G01S 19/07; G01S 19/40; G01S 19/42; G01S 19/09
USPC ........................ 342/357.23, 357.25, 357.44
See application file for complete search history.

(56) References Cited

U.S. PATENT DOCUMENTS

| | | | |
|---|---|---|---|
| 6,552,680 B1 * | 4/2003 | Barber | G01S 5/009 342/357.23 |
| 6,606,560 B1 * | 8/2003 | Clark | G01S 19/02 342/357.29 |
| 6,782,330 B1 * | 8/2004 | Clark | G01S 19/02 342/357.44 |

(Continued)

FOREIGN PATENT DOCUMENTS

| | | |
|---|---|---|
| JP | 2005-172738 A | 6/2005 |
| JP | 2007-171082 A | 7/2007 |

(Continued)

OTHER PUBLICATIONS

Office Action dated Feb. 2, 2017, issued in counterpart Japanese Patent Application No. 2015-077049, with English translation. (13 pages).

*Primary Examiner* — Chuong P Nguyen
(74) *Attorney, Agent, or Firm* — Westerman, Hattori, Daniels & Adrian, LLP (57) ABSTRACT

A positioning system includes an on-board device that includes a positioning signal receiver that receives positioning signals from plural artificial satellites, a signal generator that generates a correction signal for correcting a positioning result based on the plural positioning signals, and a broadcast distribution unit that employs a geostationary satellite to distribute the correction signal together with another broadcast signal. The signal generator generates plural of the correction signals corresponding to plural distribution target regions set such that the entire area of a distribution target is covered. The broadcast distribution unit simultaneously distributes all the plural correction signals to each of the plural distribution target regions.

9 Claims, 4 Drawing Sheets

(56) References Cited

U.S. PATENT DOCUMENTS

| | | | | |
|---|---|---|---|---|
| 6,862,526 B2 * | 3/2005 | Robbins | ............. | G01S 5/009 |
| | | | | 340/995.21 |
| 7,031,730 B1 * | 4/2006 | Barber | ............. | G01S 19/07 |
| | | | | 342/357.23 |
| 7,468,694 B2 * | 12/2008 | Shoarinejad | ............. | G01S 19/05 |
| | | | | 342/357.42 |
| 7,629,923 B2 * | 12/2009 | Huang | ............. | G01S 19/41 |
| | | | | 342/357.43 |
| 8,169,365 B2 * | 5/2012 | Shoarinejad | ............. | G01S 19/07 |
| | | | | 342/357.42 |
| 9,250,327 B2 * | 2/2016 | Kelley | ............. | H03M 7/30 |

FOREIGN PATENT DOCUMENTS

| | | |
|---|---|---|
| JP | 2014-016315 A | 1/2014 |
| JP | 2014-173891 A | 9/2014 |

* cited by examiner

POSITIONING SYSTEM, ON-BOARD DEVICE, AND POSITIONING METHOD

CROSS REFERENCES TO RELATED APPLICATIONS

The present, application claims priority under 35 U.S.C. § 119 to Japanese Patent Application No. 2015-077049, filed Apr. 3, 2015, entitled "Positioning System, On-Board Device, and Positioning Method." The contents of this application are incorporated herein by reference in their entirety.

BACKGROUND

1. Field

The present application relates to a positioning system, on-board device, and positioning method that perform positioning using positioning satellites.

2. Description of the Related Art

Since it is difficult to accurately measure position by only measuring position based on positioning signals from positioning satellites, such as GPS satellites, a high precision positioning approach is known that employs an augmentation signal from a quasi-zenith satellite. However, the measurement precision falls in cases where it is difficult to receive an augmentation signal from a quasi-zenith satellite, such as due to obstacles. Japanese Unexamined Patent Application Publication No. 2014-173891 accordingly describes an approach to such a problem, in which an augmentation signal from the quasi-zenith satellite is stored in a distribution server, and the augmentation signal stored in the distribution server is distributed over a mobile communication network (internet network) to an on-board unit that performs positioning.

Considering that a vehicle moves at a relatively fast speed, an on-board unit needs to acquire the augmentation signal (hereinafter referred to as a correction signal) with a short cycle. However, when, as described in Japanese Unexamined Patent Application Publication No. 2014-173891, a mobile communication network is utilized, there is a concern about being affected by communication bottlenecks (in communication speed and number of simultaneous communications possible), with a concern that there may be a delay in communication, or an increase in the communication volume. Moreover, an even longer delay occurs in cases where the required correction signal is distributed only after a request has been received. Moreover, for example, for such a correction signal for use in a mobile communication network within Japan, due to the communication system and standards of mobile communication networks differing in other countries to those in Japan, such mobile communication networks cannot be utilized when transmitting such a correction signal, resulting in a need to build new infrastructure.

SUMMARY

The present, application accordingly describes a positioning system, on-board device, and positioning method capable of rapidly distributing a correction signal at low cost by utilizing existing facilities.

A first aspect of the present, application is a positioning system including an on-board device including a positioning signal receiver that receives positioning signals from a plural artificial satellites, a signal generator that generates a correction signal that corrects a positioning result based on the plural positioning signals, and a broadcast distribution unit that employs a geostationary satellite to distribute the correction signal together with another broadcast signal. The signal generator generates plural of the correction signals corresponding to plural distribution target regions set such that the entire area of a distribution target is covered. The broadcast distribution unit simultaneously distributes all the plural correction signals to each of the plural distribution target regions.

According to the first aspect of the present application, the correction signals can be rapidly distributed at low cost using existing facilities.

The positioning system according to the first aspect of the present application may be configured such that the entire target area is divided into the plural distribution target regions with a virtual qrid, with the regions more affected by ionospheric delay divided more finely. The volume of data to be distributed can thereby be suppressed without lowering the positioning precision.

The positioning system according to the first, aspect of the present application may be configured such that the on-board device further includes a broadcast signal receiver that receives the other broadcast signal and the plural correction signals, a basic positioning section that performs basic positioning based on the plural positioning signals, a correction signal selector that selects, from out of the plural correction signals, the correction signal of the distribution target region including the position information obtained by the basic positioning, whereby one of the plural correction signals is selected as being associated with one of the distribution target region in which the on-board device is positioned, and a high precision positioning section that, based on the correction signal selected by the correction signal selector and the plural positioning signals, performs high precision positioning with a higher precision than that of the basic positioning. This enables positioning to be performed by employing the correction signal according to the current position of the on-board device, and enables the position information for the on-board device to be measured with high precision.

The positioning system according to the first aspect of the present application may be configured such that the signal generator respectively generates the correction signals to correct the positioning result based on the plural positioning signals, according to plural types of the artificial satellites. Accordingly, the positioning precision does not fail even for different types of artificial satellite.

A second aspect of the present application is an on-board device including a positioning signal receiver that receives positioning signals from plural artificial satellites, a broadcast signal receiver that receives a broadcast signal and a correction signal that corrects a correction result based on the plural positioning signals, with the broadcast signal and the correction signal distributed by a broadcast distribution unit employing a geostationary satellite, and a high precision positioning section that performs high precision positioning, based on the plural positioning signals and the correction signal.

According to the second aspect of the present application, the correction signals can be rapidly received at low cost using existing facilities, and the position information can be measured for the on-board device with high precision.

The on-board device according to the second aspect of the present application may be configured to further include a correction signal selector that, selects the correction signal from out of plural correction signals, and a basic positioning section that, based on the plural positioning signals, performs basic positioning at a lower precision than the high precision positioning. In this case the broadcast signal receiver receives plural correction signals corresponding to plural regions, the correction signal selector selects, from out of the plural correction signals, the correction signal of the region including position information obtained by the basic positioning, and the high precision positioning section performs high precision positioning, based on the correction signal selected by the correction signal selector and the plural positioning signals. This enables positioning to be performed by employing the correction signal according to the current position of the on-board device, and enables the position information for the on-board device to be measured with high precision.

The on-board device according to the second aspect of the present application may be configured such that the entire area of a distribution target is divided into the plural regions with a grid, with the regions more affected by ionospheric delay are divided more finely. The volume of data to be distributed can thereby be suppressed without lowering the positioning precision.

The on-board device according to the second aspect of the present application may be configured such that the broadcast signal receiver respectively receives correction signals according to plural types of the artificial satellites. Accordingly, the positioning precision does not fall even for different, types of artificial satellite.

A third aspect of the present application is a positioning method including a positioning signal reception step in which positioning signals are received from plural artificial satellites, a signal generating step in which a correction signal is generated that corrects a positioning result based on the plural positioning signals, and a broadcast distribution step in which a geostationary satellite is employed to distribute the correction signal together with another broadcast signal. The signal generating step generates plural of the correction signals corresponding to plural of distribution target regions set-such that the entire area of a distribution target is covered. The broadcast distribution step simultaneously distributes all the plural correction signals to each of the plural distribution tarqet regions.

According to the third aspect of the present application, the correction signals can be rapidly distributed at low cost using existing facilities.

The positioning method of the third aspect of the present application may be configured such that the entire area is divided into the plurality of distribution target regions with a grid, with the regions more affected by ionospheric delay divided more finely. The volume of data to be distributed can thereby be suppressed without lowering the positioning precision.

The positioning method according to the third aspect of the present application may further include: a broadcast signal receiving step in which the other broadcast signal and the plural correction signals are received; a basic positioning step in which basic positioning is performed based on the plural positioning signals; a correction signal selection step in which, from out of the plural correction signals, the correction signal of the distribution target region including the position information obtained by the basic positioning is selected; and a high precision positioning step in which, based on the correction signal selected in the correction signal selection step and the plural positioning signals, high precision positioning is performed with a higher precision than that of the basic positioning. This enables positioning to be performed by employing the correction signal according to the current position of the on-board device, and enables the position information for the on-board device to be measured with high precision.

The positioning method of the third aspect of the present application may be configured such that the signal generating step respectively generates the correction signals to correct the positioning result based on the plural positioning signals, according to plural types of the artificial satellites. Accordingly, the positioning precision does not fall even for different types of artificial satellite.

DESCRIPTION OF THE PREFERRED EMBODIMENTS

Detailed explanation follows regarding a preferable embodiment of a positioning system, on-board device, and positioning method according to the present application, with reference to the drawings.

Figure 1:
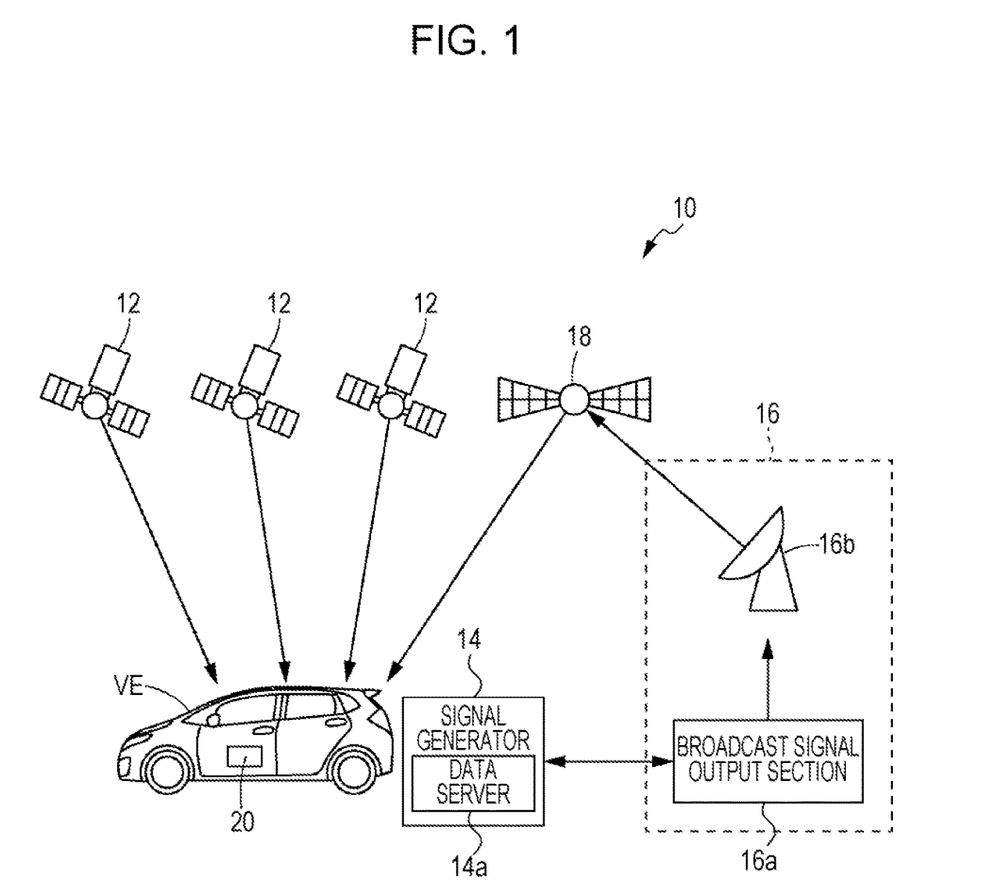
FIG. 1 is an overall configuration diagram of a positioning system of an embodiment.

FIG. 1 is an overall configuration diagram of a positioning system 10. The positioning system 10 includes plural artificial satellites 12 that are positioning satellites, a signal generator 14, a broadcast distribution unit 16, a geostationary satellite 18, and an on-board unit 20 installed in a vehicle VE.

The plural artificial satellites 12 are artificial satellites employed in a global navigation satellite system (GNSS) that is a satellite positioning system. The plural artificial satellites 12 are configured from artificial satellites employed in the American satellite positioning system (GPS) (hereinafter referred to as GPS satellites), from artificial satellites employed in the European satellite positioning system (Galileo) (hereinafter referred to as Galileo satellites), from artificial satellites employed in the Russian satellite positioning system (GLONASS) (hereinafter referred to as GLONASS satellites), or from artificial satellites employed in the Chinese satellite positioning system (BeiDou) (hereinafter referred to as BeiDou satellites). The artificial satellites 12 distribute (transmit) positioning signals. In the present embodiment, the artificial satellites 12 are GPS satellites unless stated otherwise.

The signal generator 14 generates a correction signal (augmentation signal) to correct the positioning result based on the positioning signal. The signal generator 14 may, for example, be a device employed in a multi-GNSS advanced demonstration orbit and clock analysis (MADOCA) product developed by JAXA. The correction signal generated by the signal generator 14 includes correction information to correct (remove) the effect of ionospheric delays. Ionospheric delays arise as radio waves pass through the ionosphere around the earth, due to the speed of radio waves being delayed by an amount proportional to the electron density and inversely proportional to the square of the radio wave frequency. Thus when positioning signals (radio waves) arriving from the artificial satellites 12 reach the ground, a delay (ionospheric delay) arises due to being affected by the ionosphere. Thus the precision of positioning based on the positioning signal on the ground is reduced by the ionospheric delay, The electron density mainly rises near to the equator, and on sunny days. Namely, the electron density is high in regions where the energy of sunlight is high, and, conversely, the electron density is low in regions where the energy of sunlight is low. Thus the degree affected by ionospheric delay is also comparatively large in regions where the energy of sunlight is high, and, comparatively small in regions where the energy of sunlight is low. The ionospheric delay differs by latitude and longitude, and plural regions f (hereinafter also sometimes referred to as distribution target regions f) are set so as to cover the entire area of the distribution target for the broadcast signals and correction signals. The signal generator 14 generates respective correction signals corresponding to each of the distribution target regions f. In the present embodiment, explanation follows regarding an example in which the USA is the distribution target. Thus, in the present embodiment, the territory (the entire area) of the USA is divided into plural distribution target regions f, and the signal generator 14 generates respective correction signals for each of the divided distribution target regions f. The signal generator 14 includes a data server 14a, and the generated correction signals are stored in the data server 14a. When doing so, the signal generator 14 associates the generation time of the correction signal, and region information identifying the distribution target region f (for example, information regarding the latitude and longitude), with the generated correction signal, and stores the correction signal for each of the distribution target regions f in the data server 14a. The signal generator 14 generates a new correction signal at a fixed cycle, or when a generation timing is reached. Mot only are the latest correction signals stored in the data server 14a, but also correction signals generated in the past are stored as history. Specific generation methods for correction signals are known technology, and so explanation thereof will be omitted.

Figure 2:
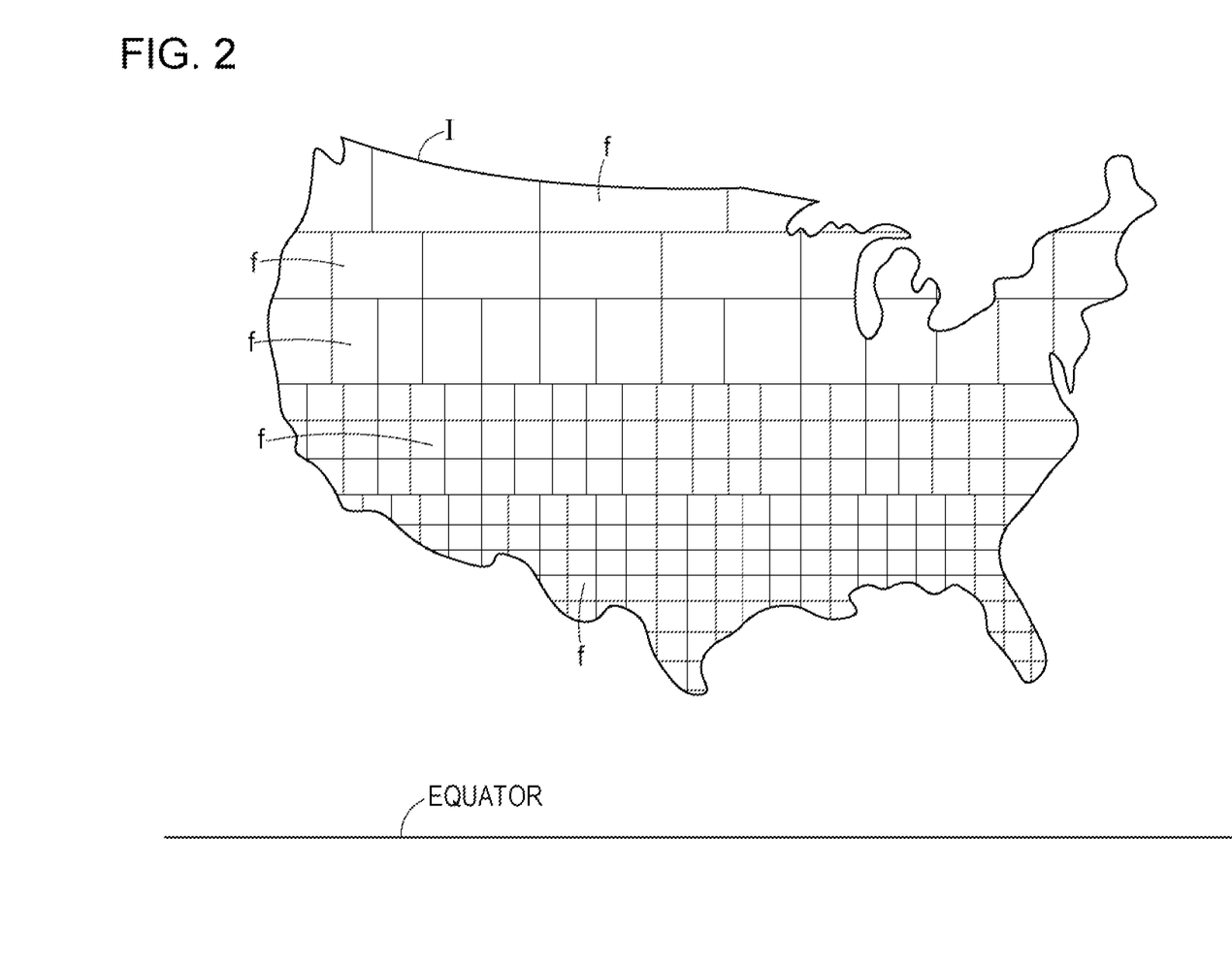
FIG. 2 is an image illustrating an example of a condition in which the entire area of a distribution target has been divided into plural regions.

FIG. 2 is a diagram illustrating an example of a condition in which the entire area of the distribution target has been divided into plural regions f. For ease of explanation, an example is illustrated in FIG. 2 in which mainland USA I (the 48 states excluding Alaska and Hawaii, plus Washington DC) has been divided into plural regions f. As illustrated in FIG. 2, mainland USA I is divided into plural regions (distribution target regions) f using a grid (mesh pattern). Due to the large area covered by the mainland USA I, the number of correction signals (data volume) to be generated also expands when the mainland I is divided using a fine grid having smaller grid cell sizes or smaller line pitches. Thus for the plural distribution target regions f, regions more affected by ionospheric delay (regions near to the equator in the example illustrated in FIG. 2) are more finely divided (smaller), and regions less affected by ionospheric delay (regions far away from the equator in the example illustrated in FIG. 2) are more coarsely divided (larger). This is because in regions less affected by ionospheric delay, the change in the degree of effect by ionospheric delay within the region of each distribution target region f is small, even when the regions are made large for these distribution target regions f, This thereby enables the data volume to be suppressed. Since the degree of effect by ionospheric delay varies between strong sunlight and weak sunlight, the divisions between the plural distribution target regions f may be changed by period of time, or as time passes. For example, since the degree of effect by ionospheric delay changes from daytime to nighttime, and from winter to summer, the fineness by which the plural distribution target regions f are divided may be changed, such as by season, or by time band in each day.

Returning to FIG. 1, the broadcast distribution unit 16 is a unit that employs the geostationary satellite 18 to distribute (transmit) broadcast signals (for example, a broadcast signal such as radio, traffic information, or a weather forecast). The broadcast distribution unit 16 may, for example, be owned by a broadcasting company, such as Sirius XM Radio, that broadcasts to the USA and Canada using communication satellites. Namely, an existing unit may be employed as the broadcast, distribution unit 16. The broadcast distribution unit 16 is capable of distributing the correction signal generated by the signal generator 14 together with a broadcast signal. In the present, embodiment, the broadcast distribution unit 16 distributes the correction signal together with a broadcast signal in the USA. The broadcast distribution unit 16 distributes the plural correction signals, corresponding to respective plural distribution target regions f, simultaneously to each of the plural divided distribution target regions f. Thus in each of the distribution target regions f, plural correction signals, corresponding to the plural distribution target regions f, are distributed all together. Thus the content, is the same for the correction signals distributed in each of the distribution target regions f, and there is no need to change the correction signal that is distributed to each distribution target region f. When distributing the plural correction signals, the broadcast distribution unit 16 distributes the plural correction signals together with regional information that is being stored in association with each of the correction signals.

The broadcast distribution unit 16 includes a broadcast signal output section 16a, and a satellite antenna 16b. The broadcast signal output section 16a acquires a correction signal from the data server 14a of the signal generator 14, converts the acquired correction signal and broadcast signal into an analogue signal (radio wave), and outputs the analogue signal to the satellite antenna 16b. The correction signal (including region information) and broadcast signal arriving at the satellite antenna 16b are then distributed by employing the geostationary satellite 18. The broadcast signal output section 16a acquires the correction signal for each of the distribution target regions f from the data server 14a.

Figure 3:
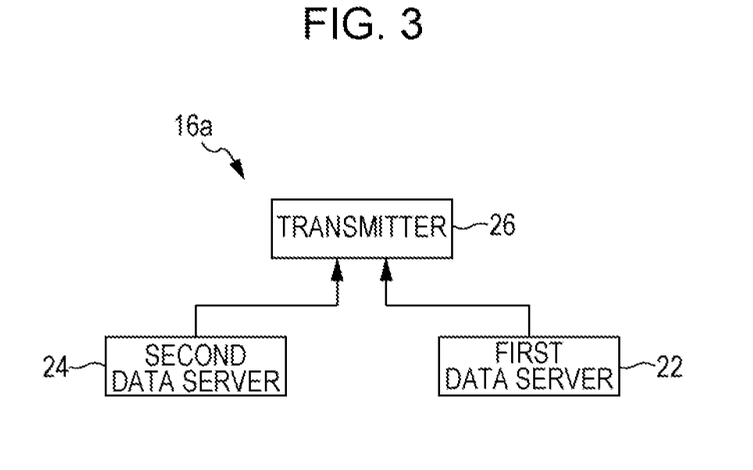
FIG. 3 is a diagram illustrating an example of a configuration of the broadcast signal output section illustrated in FIG. 1.

FIG. 3 is a diagram illustrating an example of a configuration of the broadcast signal output section 16a. The broadcast signal output section 16a includes a first data server 22, a second data server 24, and a transmitter 26. A broadcast signal is stored in the first data server 22, and the stored broadcast signal is output to the transmitter 26. The second data server 24 accesses the data server 14a of the signal generator 14, and acquires the latest correction signal (including region information) for each of the distribution target regions f. The second data server 24 then stores the plural latest correction signals that have been acquired, and outputs the plural latest correction signals to the transmitter 26. The transmitter 26 converts the digital broadcast signal arriving from the first data server 22 and the plural digital correction signals arriving from the second data server 24 into analogue signals (radio waves), and outputs the converted signals to the satellite antenna 16b. The plural correction signals corresponding to each of the plural distribution target regions f are thereby all distributed simultaneously to each of the plural distribution target regions f.

The on-board unit 20 (on-board device) receives positioning signals distributed (transmitted) by the plural artificial satellites 12, and performs positioning based on the plural positioning signals received. The on-board unit 20 performs positioning by employing the plural positioning signals distributed by the plural artificial satellites 12, and employing the correction signals distributed (transmitted) by the broadcast distribution unit 16. Positioning that is performed by also using the correction signals has a more precise positioning result than positioning that is performed without employing a correction signal. Hence the former positioning is referred to as high precision positioning, and the latter is referred to as basic positioning. The on-board unit 20 also receives the broadcast signal distributed by the broadcast distribution unit 16.

Figure 4:
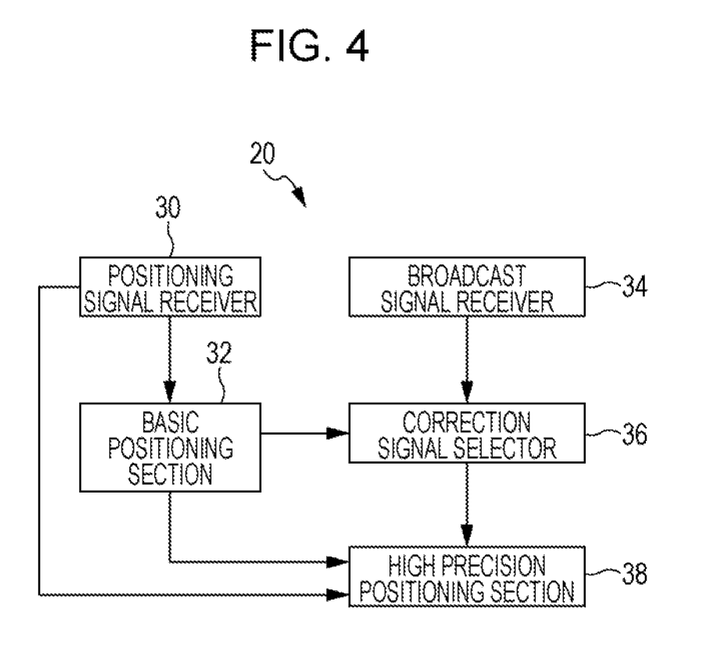
FIG. 4 is an example of a configuration of the on-board unit illustrated in FIG. 1.

FIG. 4 is a diagram illustrating an example of a configuration of the on-board unit 20. The on-board unit 20 includes a positioning signal receiver 30, a basic positioning section 32, a broadcast signal receiver 34, a correction signal selector 36, and a high precision positioning section 38. The positioning signal receiver 30 includes an antenna, not illustrated in the drawings, uses the antenna to receive the positioning signals transmitted from the plural artificial satellites 12, and converts the positioning signals of the plural analogue signals received into digital signals. The positioning signal receiver 30 then outputs the plural digital positioning signals to the basic positioning section 32 and the high precision positioning section 38. The basic positioning section 32 performs positioning (basic positioning) based on the plural arriving positioning signals. The position information of the on-board unit 20 (the vehicle VE) is thereby measured. Methods of measuring position information based on positioning signals are known technology, and so specific explanation thereof will be omitted. The basic positioning section 32 may employ output signals, from non-illustrated sensors (for example, accelerometers), to detect the orientation and state of travel of the vehicle VE, and to measure the position information of the on-board unit 20. The positioning result of the basic positioning section 32 (position information of the on-board unit 20) is output to the correction signal selector 36. The basic positioning section 32 may also output the positioning result to the high precision positioning section 38.

The broadcast signal receiver 34 includes an antenna, not illustrated in the drawings, uses the antenna to receive the broadcast signal and plural correction signals corresponding to the plural distribution target regions f arriving from the geostationary satellite 18, and converts the analogue broadcast signal and plural correction signals (including region information) received into digital signals. The broadcast signal receiver 34 outputs the plural digital correction signals to the correction signal selector 36. The digital broadcast signal received by the broadcast signal receiver 34 is output from a speaker as sound, through a non-illustrated tuner, or is displayed as an image on a display.

The correction signal selector 36 selects, from the plural correction signals corresponding to the plural distribution target regions f, the correction signal for the distribution target region f that includes the position information obtained by the basic positioning section 32. Namely, the correction signal selector 36 selects, from the plural correction signals, the correction signal of the distribution target region f that includes the position where the on-board unit 20 (the vehicle VE) is currently present. Specifically, the correction signal selector 36 selects, from the region information associated with each of the plural correction signals, the correction signal corresponding to the region information that includes the position of the on-board unit 20 (the vehicle VE) obtained by the basic positioning section 32. Namely, identification of the correction signal is performed based on the region information associated with the correction signal. The correction signal selector 36 outputs the selected correction signal to the high precision positioning section 38.

The high precision positioning section 38 performs positioning (high precision positioning) for the on-board unit 20 (the vehicle VE) based on the plural positioning signals transmitted by the positioning signal receiver 30, and on the correction signal transmitted by the correction signal selector 36. The position information of the on-board unit 20 (of the vehicle VE) is thereby measured with higher precision than in basic positioning. The high precision positioning section 38 may measure the position information of the on-board unit 20 all at once from the plural positioning signals and the correction signal. The high precision positioning section 38 may also measure position information of the on-board unit 20 in two stages: first, performing positioning (basic positioning) based on the plural positioning signals, then, based on the correction signal, correcting the position information of the on-board unit 20 obtained by the basic positioning. In cases where the position information of the on-board unit 20 is measured in two stages, the high precision positioning section 38 may, without performing the basic positioning, utilize the measurement result of the basic positioning section 32 as it is. Methods for measuring the position information based on such positioning and correction signals are known technology, and so specific explanation thereof will be omitted. The high precision positioning section 38 may employ an output signal of non-illustrated sensors (for example, accelerometers) to detect the orientation and state of travel of the vehicle VE, and to measure the position information of the on-board unit 20. The measurement result of the high precision positioning section 38 (the position information of the on-board unit 20) is utilized by a non-illustrated navigation system or the like, installed in the vehicle VE.

Thus the positioning system 10 of the present embodiment includes the on-board unit 20 that receives the positioning signals from the plural artificial satellites 12, the signal generator 14 that generates correction signals for correcting the measurement result based on the plural positioning signals, and the broadcast distribution unit 16 that employs the geostationary satellite 18 to distribute the correction signals together with another broadcast signal (a broadcast signal such as radio or a weather forecast). The signal generator 14 generates plural correction signals corresponding to the plural distribution target regions f that have been set so as to cover the entire area of the distribution target. The broadcast distribution unit 16 distributes all the plural correction signals simultaneously to each of the plural distribution target regions f. This thereby enables the correction signals to be distributed rapidly and at low cost using existing facilities. Moreover, since the plural correction signals are all distributed simultaneously to each of the distribution target regions f, the content of the correction signals distributed to each of the distribution target regions f is the same. Namely, there is no need to change the correction signals distributed according to each of the distribution target regions f, enabling rapid distribution of the correction signals at low cost.

The entire area of the distribution target is divided into the plural distribution target regions f by a grid, with the regions more affected by ionospheric delay divided more finely. This thereby enables the data volume for distribution to be suppressed, without lowering the measurement precision.

The on-board unit 20 includes the positioning signal receiver 30 that receives the positioning signals from the plural artificial satellites 12. The on-board unit 20 includes the broadcast, signal receiver 34 that receives the broadcast signal, and the correction signals for correcting a correction result based on the plural positioning signals, the broadcast signal and the correction signals having been distributed by the broadcast distribution unit 16 using the geostationary satellite 18. The on-board unit 20 includes the high precision positioning section 38 that, performs high precision positioning based on the plural positioning signals and the correction signals. This thereby enables the corrections signal to be rapidly received at low cost using existing facilities, and enables the position information of the on-board unit to be measured with high precision.

The on-board unit 20 also includes the basic positioning section 32 that performs basic positioning, and the correction signal selector 36 that selects the correction signal from out of plural correction signals. The broadcast signal receiver 34 receives the plural correction signals corresponding to the plural regions f. The correction signal selector 36 selects, from out of the plural correction signals, the correction signal of the region f including the position information obtained by basic positioning. The high precision positioning section 38 performs high precision positioning based on the correction signal selected by the correction signal selector 36 and the plural positioning signals. This thereby enables positioning to be performed using the correction signal corresponding to the current position of the on-board unit, enabling position information of the on-board device to be measured with high precision.

Explanation has been given above in the above embodiment of GPS satellites as the artificial satellites 12. However, the plural artificial satellites 12 may be configured from plural types of positioning satellite, such as Galileo satellites, GLONASS satellites, or BeiDou satellites. In such cases, since the correction signals (for example, the correction signal for removing ionospheric delay) are different for each type of artificial satellites 12, the signal generator 14 may be configured to generate correction signals according to the plural types of artificial satellites 12. In such cases, the signal generator 14 generates respective correction signals according to the plural types of artificial satellites 12 for each of the distribution target regions f. The broadcast distribution unit 16 distributes all the plural correction signals for each type of artificial satellites 12 corresponding to the plural distribution target regions f, simultaneously to each of the plural distribution target regions f. The high precision positioning section 38 of the on-board unit 20 then employs the correction signal corresponding to the type of artificial satellite 12 that emitted the positioning signal received by the positioning signal receiver 30, to measure the position information of the on-board unit 20 with high precision. Thus there is no reduction in the positioning precision, even in cases of different types of satellite. In such cases, the correction signal selector 36 selects, from the correction signals of the distribution target region f that included the position information of the on-board unit 20 obtained by the basic positioning section 32, the correction signal that corresponds to the type of artificial satellite 12 that emitted the positioning signal received by the positioning signal receiver 30. For example, in cases where the artificial satellite 12 that emitted the positioning signal received by the positioning signal receiver 30 is a Galileo satellite, a correction signal corresponding to the Galileo satellite is selected.

What is claimed is:

1. A positioning system comprising:
   a vehicle's on-board device including a positioning signal receiver that receives a plurality of positioning signals from a plurality of artificial satellites to obtain a position of the on-board device in a target area based on the plurality of the positioning signals;
   a signal generator that generates a plurality of correction signals for correcting the position of the on-board device, the plurality of the correction signals respectively corresponding to a plurality of distribution target regions that cover the target area; and
   a broadcast distribution unit that distributes the plurality of correction signals together with broadcast signals via a geostationary satellite, the broadcast distribution unit being configured to distribute all the plurality of correction signals to each of the plurality of distribution target regions, wherein
   the plurality of distribution target regions are defined by a grid that divides the target area into the plurality of distribution target regions, and fineness of the grid by which the plural distribution target regions are divided is changed such that the plurality of distribution target regions more affected by ionospheric delay are divided more finely, while the plurality of distribution target regions less affected by ionospheric delay are divided more coarsely.

2. The positioning system according to claim 1, wherein the vehicle's on-board device further comprises:
   a broadcast signal receiver that receives the broadcast signals and the plurality of correction signals;
   a basic positioning section that performs basic positioning of the vehicle's on-board device based on the plurality of positioning signals to obtain a basic position of the vehicle's on-board device in the target area;
   a correction signal selector that selects, from out of the plurality of correction signals, the correction signal corresponding to the distribution target region that relates to the basic position of the vehicle's on-board device obtained by the basic positioning; and
   a high precision positioning section that, based on the correction signal selected by the correction signal selector and the plurality of positioning signals, performs high precision positioning of the vehicle's on-board device in the target area with a higher precision than that of the basic positioning.

3. The positioning system according to claim 1, wherein:
   the signal generator respectively generates the plurality of correction signals to correct the position of the vehicle's on-board device, according to the plurality of the artificial satellites.

4. An on-board device for a vehicle comprising:
   a positioning signal receiver that receives a plurality of positioning signals from a plurality of artificial satellites to obtain a position of the on-board device in a target area;
   a broadcast signal receiver that receives a broadcast signal and a correction signal for correcting the position of the on-board device, the broadcast signal and the correction signal being distributed by a broadcast distribution unit via a geostationary satellite; and
   a high precision positioning section that performs high precision positioning of the on-board device in the target area, based on the plurality of positioning signals and the correction signal, wherein
   the plurality of distribution target regions are defined by a grid that divides the target area into the plurality of distribution target regions, and fineness of the grid by which the plural distribution target regions are divided is changed such that the plurality of distribution target regions more affected by ionospheric delay are divided more finely, while the plurality of distribution target regions less affected by ionospheric delay are divided more coarsely.

5. The on-board device according to claim 4, wherein the broadcast signal receiver is configured to receive a plurality of the correction signals that respectively correspond to a plurality of regions in the target area, the on-board device further comprising:
   a basic positioning section that, based on the plurality of positioning signals, performs basic positioning of the on-board device at a lower precision than the high precision positioning to obtain a basic position of the on-board device in the target area; and
   a correction signal selector that selects, from out of the plurality of correction signals, the correction signal corresponding to the region that relates to the basic position of the on-board device obtained by the basic positioning, wherein
   the high precision positioning section performs high precision positioning of the on-board device in the target area, based on the correction signal selected by the correction signal selector and the plurality of positioning signals.

6. The on-board device of claim 4, wherein
   the broadcast signal receiver respectively receives a plurality of the correction signals according to the plurality of the artificial satellites.

7. A positioning method which utilizes the positioning system of claim 1, the method comprising:
   a positioning signal reception step of receiving a plurality of positioning signals from a plurality of artificial satellites to perform positioning of a vehicle's on-board device in a target area based on the plurality of the positioning signals;
   a signal generating step of generating a plurality of correction signals to correct the position of the vehicle's on-board device; and
   a broadcast distribution step of distributing via a geostationary satellite the plurality of correction signals together with broadcast signals, wherein
   the signal generating step generates the plurality of the correction signals respectively corresponding to a plurality of distribution target regions that cover the target area, and
   the broadcast distribution step distributes all the plurality of correction signals to each of the plurality of distribution target regions, wherein
   the plurality of distribution target regions are defined by a grid that divides the target area into the plurality of distribution target regions, and fineness of the grid by which the plural distribution target regions are divided is changed such that the plurality of distribution target regions more affected by ionospheric delay are divided more finely, while the plurality of distribution target regions less affected by ionospheric delay are divided more coarsely.

8. The positioning method according to claim 7, further comprising:
   a broadcast signal receiving step of receiving the broadcast signals and the plurality of correction signals;
   a basic positioning step of performing basic positioning of the vehicle's on-board device based on the plurality of positioning signals to obtain a basic position of the vehicle's on-board device in the target area;
   a correction signal selection step of selecting, from out of the plurality of correction signals, the correction signal corresponding to the distribution target region that relates to the basic position of the vehicle's on-board device obtained by the basic positioning; and
   a high precision positioning step of performing, based on the correction signal selected in the correction signal selection step and the plurality of positioning signals, high precision positioning of the vehicle's on-board device in the target area with a higher precision than that of the basic positioning.

9. The positioning method according to claim 7, wherein:
   the signal generating step respectively generates the plurality of correction signals to correct the position of the vehicle's on-board device, according to the plurality of the artificial satellites.

\* \* \* \* \*